Feb. 25, 1969   H. B. TAYLOR   3,429,510
AGRICULTURE SPRAY UNIT
Filed June 24, 1966

INVENTOR.
Henry B. Taylor

INVENTOR.
Henry B. Taylor

United States Patent Office 3,429,510
Patented Feb. 25, 1969

3,429,510
AGRICULTURE SPRAY UNIT
Henry Bernard Taylor, Beaumont, Tex.
(Rte. 10, Allen Road, Macon, Ga. 31206)
Filed June 24, 1966, Ser. No. 560,393
U.S. Cl. 239—171                                1 Claim
Int. Cl. B64d 1/18, 1/00; A01n 17/08

ABSTRACT OF THE DISCLOSURE

An agricultural spraying device for aircraft for the purpose of spraying chemicals, the device comprising a hollow shaft having a sideward jet at one end for discharge of chemicals which are directed into the path of a concentric spinning cone for dispersing the discharged chemical into the air stream.

---

Figure 1:
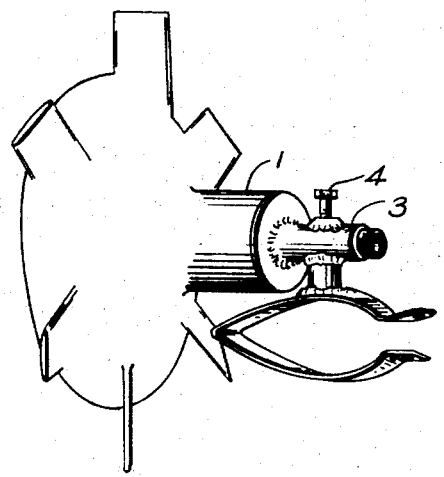

This invention relates to certain specific improvements in apparatus for spraying liquid chemicals from airplanes to improve conditions conducive to better agronomy.

My invention is manifestly diverse from other devices or systems designed and fabricated to be mounted on aircraft by virtue of the extreme simplicity of design; having only one moving part externally located with respect to the aircraft fuselage. Each complete unit of the spin-cone spray applicator, shown assembled in three views on sheet 1 of the accompanying illustrations, is easily mounted or dismounted in minutes due to the use of a quick-connect flexible coupling, not shown, and only one bolt that affixes the unit to a hollow, transverse boom mounted beneath the forward portion of the aircraft. The transverse hollow boom is rigidly affixed to and beneath the lower wing on bi-winged aircraft, and also acts as the main trunk line for conveying the liquid chemicals from a tank equipped with a suitable filler neck at the top and a suitable sediment trap at the bottom, and situated within the fuselage, to the individual spin-cone applicators through the aforementioned flexible quick-connections.

A suitable liquid handling pump, not shown, is located in the main discharge line just below the reservoir tank, also not shown, so as to raise the pressure of the liquid in the trunk lines, forcing the fluid through the hollow shaft 5 of the spin-cone applicator, thence through several small orifices drilled in a brass ferrule 7 which is threaded onto the rear end of the hollow shaft, and itself capped with a removable brass cap 6. The orifices are radially faced, or, transverse to the axis of the hollow shaft 5, and because of their direction and proximity to the concave surface of the rapidly rotating spin-cone 1 the liquid chemicals, forced onto the aforesaid revolving surface are carried by centrifugal force to the periphery of the cone, effused through a diaphragm of fine mesh stainless steel screen (not shown) and disjected into space in a vapor-like or near gaseous cloud of very minute particles.

Figure 2:
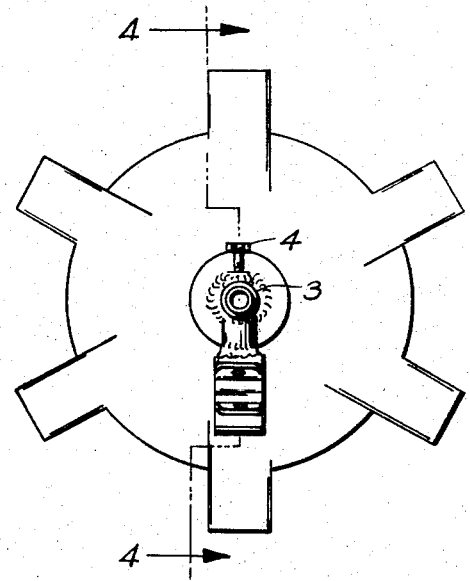
Figure 3:
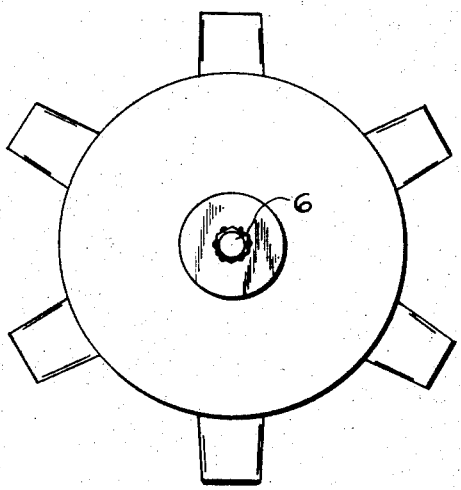
Figure 5:
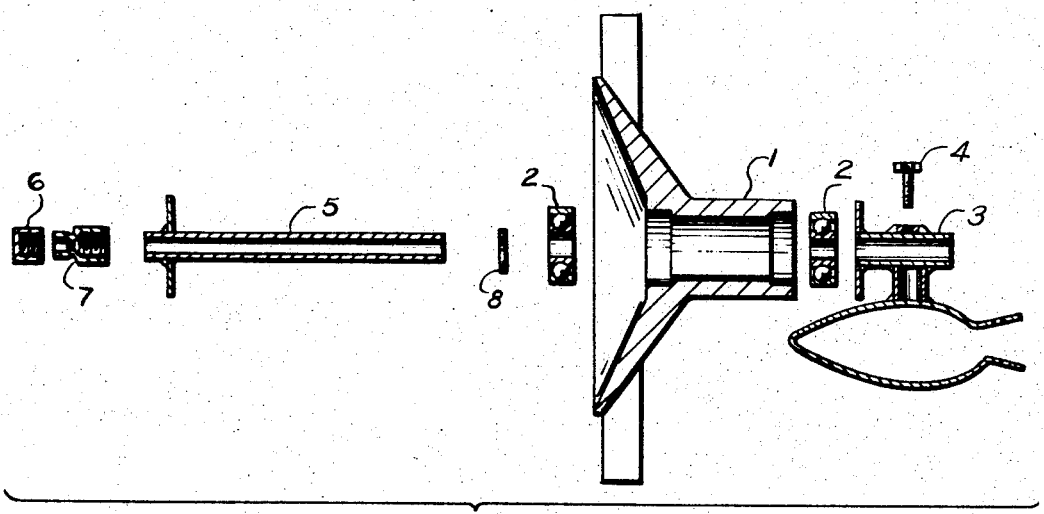
Figure 4:
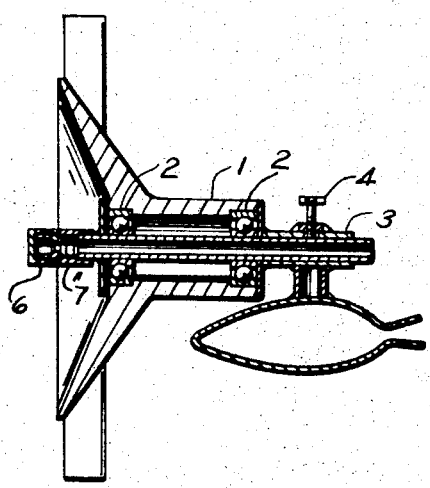

The efficient dispersal of chemicals by use of the spin-cone applicator (FIGS. 1, 2, 3) makes possible the elimination of excess weight caused by necessary dilution of chemicals when applied by less efficient apparatus. Therefore the reservoir can be filled with a more concentrated solution, thereby allowing the pilot to make more "passes" during a given voyage, since he will not deplete his supply so quickly.

As the "exploded" and the assembled sectional views on sheet 2 of the accompanying drawings illustrate, the spin-cone spray applicator is not only small in size, but compact and simple. The aluminum alloy cone is die-cast monophyletically, the vanes being an integrant of the cone and hub. The solid hub is machine bored through, and then each end milled to accept the sealed bearings 2. A thrust washer 8 is slipped over the long end of the shaft 5 to rest against the flange, the shaft 5 is then passed through the bearings 2 and hub 1 until the thrust washer is snug against the rear bearing 2. The clamp bracket 3 is then slipped over the exposed end of the shaft 5 until it is snug against the forward bearing 2, then the set-screw 4 is inserted and tightened hard against the shaft 5. A brass L (not shown) or other suitable fitting is then screwed onto the threaded extreme forward end of the hollow shaft 5 to facilitate the attachment of the liquid line quick-connection. The assembled spin-cone spray applicator may easily be attached to the transverse hollow boom, in batteries of desired number.

The aforementioned pump and a quick-acting valve are operated simultaneously to assure controlled spraying.

Compendium

I shall attempt, in this peroration, to elucidate the salient features of the spin-cone spray applicator, which I claim to be unique and original.

Compactness, lightness, and simplicity were actualized as well as the primary obligation of creating a durable functionary device for the efficient dispersal of liquid chemicals from an aircraft.

The hollow steel shaft serves a twofold purpose; that of a tube for conveying the fluid to the orifices and to act as a spindle for the rapidly spinning cone.

I make claim as inventor and originator of the spin-cone spray applicator herein described, and the ordonnance of the device. I reserve the right to make modifications as fall within the scope of the inventive concept.

I claim:

1. In an argicultural spray unit for aircraft, the combination of a mounting bracket for securement to a boom of an aircraft, said bracket including a generally U-shaped band with openings through the ends thereof for receiving a mounting bolt, a bearing secured integrally with said band, said bearing having an opening therethrough, a shaft fitted into said opening and secured in locked position therein by a set screw, a longitudinal opening extending through a major portion of said shaft and communicating with one end of said shaft, and with a transverse extending jet near the opposite end, said shaft being fitted through a freely rotatable spinning cone, comprising a conical body concentric with said shaft, said body having radially extending fan blades, said shaft first end threadingly secured to a chemical supply source, and said shaft end having said jet being extended forward of said body so that a chemical sprayed from said jet intercepts said fan blades.

References Cited

UNITED STATES PATENTS

| | | | |
|---|---|---|---|
| 1,627,686 | 5/1927 | Carlstedt | 239—223 |
| 1,974,538 | 9/1934 | Johnston | 239—77 X |
| 2,098,887 | 11/1937 | Satterlee | 244—136 |
| 2,537,251 | 1/1951 | Wilson | 239—171 X |
| 2,721,102 | 10/1955 | Nissen | 239—171 |
| 2,979,269 | 4/1961 | Bals | 239—77 |

FOREIGN PATENTS

| | | |
|---|---|---|
| 244,118 | 3/1963 | Australia. |
| 290,666 | 8/1929 | Great Britain. |

EVERETT W. KIRBY, Primary Examiner.

U.S. Cl. X.R.

239—77, 224; 244—136.5